United States Patent [19]

Smith et al.

[11] Patent Number: 5,289,565
[45] Date of Patent: Feb. 22, 1994

[54] METHODS AND APPARATUS FOR CYMK-RGB RAMDAC

[75] Inventors: David M. Smith, Campbell; Keith E. Sorenson, Cupertino, both of Calif.

[73] Assignee: RasterOps Corporation, Santa Clara, Calif.

[21] Appl. No.: 879,076

[22] Filed: May 1, 1992

Related U.S. Application Data

[63] Continuation of Ser. No. 550,272, Jul. 9, 1990, abandoned.

[51] Int. Cl.⁵ .................... G03F 3/08; G06F 15/68
[52] U.S. Cl. ......................... 395/131; 358/527
[58] Field of Search ............ 340/706, 747, 750; 395/129, 131, 162, 164, 165, 166; 358/80, 76, 75

[56] References Cited

U.S. PATENT DOCUMENTS

| | | | |
|---|---|---|---|
| 4,349,835 | 9/1982 | Horiguchi et al. | 358/76 |
| 4,517,590 | 5/1985 | Nagashima et al. | 358/75 |
| 4,517,591 | 5/1985 | Nagashima et al. | 358/75 |
| 4,668,980 | 5/1987 | Stansfield et al. | 358/80 |
| 4,893,179 | 1/1990 | Ito | 358/79 |
| 4,897,806 | 1/1990 | Cook et al. | 364/522 |
| 4,924,301 | 5/1990 | Surbrook | 358/75 |
| 4,959,790 | 9/1990 | Morgan | 364/518 |

FOREIGN PATENT DOCUMENTS

| | | | |
|---|---|---|---|
| 0188098 | 7/1986 | European Pat. Off. | 1/46 |
| 0209266 | 1/1987 | European Pat. Off. | 1/46 |
| 0338457 | 10/1989 | European Pat. Off. | 1/46 |

*Primary Examiner*—Phu K. Nguyen
*Attorney, Agent, or Firm*—Skjerven, Morrill, MacPherson, Franklin & Friel

[57] ABSTRACT

A thirty-two bit frame buffer provides real time conversion of CYMK color data to RGB color data for display on a video monitor. The frame buffer operates at a video rate of 100 mHz and includes pipelined arithmetic using look up tables for some of the CYMK to RGB conversion steps. Also provided are look up tables providing gamma correction and pixel-by-pixel selection of CYMK to RGB conversion, to allow display of an RGB window in a CYMK information display.

15 Claims, 7 Drawing Sheets

METHODS AND APPARATUS FOR CYMK-RGB RAMDAC

This application is a continuation of application Ser. No. 07/550,272, filed Jul. 9 1990, now abandoned.

BACKGROUND OF THE INVENTION

1. Field of the Invention

This invention relates to data conversion for video displays and more specifically to a method and apparatus for converting CYMK data structures to RGB data structures in real-time for use in a video frame buffer.

2. Description of the Prior Art

Color printed media is generally commercially produced by a process called four color printing. The four color components (inks) used in the printing industry are Cyan, Yellow, Magenta, and Black (CYMK). The use of computer workstations in the printing industry allows rapid design of color printed products such as brochures, posters, etc. One difficulty in using the computer workstation and its color display (monitor) in the print industry is that the CRT (cathode ray tube) display uses Red, Green, and Blue (RGB) colors instead of CYMK. This presents a problem in that the computer programs used by the print industry require both types of data structures to be maintained and manipulated. This is both time consuming from a software program's point of view as well as inefficient with respect to computer memory usage.

SUMMARY OF THE INVENTION

An objective of the invention is to solve these two problems of the prior art. In accordance with the invention, a video RAMDAC (random access memory digital to analog converter) is provided which converts CYMK data to RGB data selectively on a pixel-by-pixel basis. This video RAMDAC together with video RAM is a portion of a frame buffer (i.e., a controller that controls the video monitor). The RGB digital data is converted by a high speed Digital to Analog converter (DAC) in the RAMDAC to analog format which is sent to the video monitor. The video RAMDAC also provides for display of RGB data simultaneously on the same monitor by pixel selection logic. This mixed mode functionality is advantageous in the contemporary workstation environment where the computer may be used to perform other, non-print-related tasks simultaneously.

To support the RAMDAC and in one embodiment included in the same integrated circuit as the RAMDAC, the inputs to the CYMK-RGB converter subsection originate from logic circuitry which performs the serialization from the video RAM array. In addition the outputs from the CYMK-RGB converter subsection connect to three 256×9 bit LUTs (look up tables) for conventional gamma correction. The LUTs' output feeds three 9-bit DACs.

Therefore in accordance with the invention a thirty-two bit frame buffer (eight bits for each of four color components CYMK) is provided. The frame buffer includes a RAMDAC which combines look up tables with digital-to-analog conversion, for real-time conversion of CYMK data to RGB data. The associated complex arithmetic is divided into small portions and pipelined at a cycle rate of less than one pixel clock time. This allows real time editing of images such as photographs. The RAMDAC look up tables allow rapid calculation of complex functions such as exponentials. Data conversion is performed in the frame buffer, rather than in a front-end processor as in the prior art. Thus the data is only converted from CYMK to RGB for display purposes, and otherwise remains as CYMK data. Thus the computer data space is thirty-two bits rather than the prior art twenty-four bits for RGB.

Additionally, an input to the RAMDAC is provided to allow the user on a pixel-by-pixel basis not to convert from CYMK data to RGB data, but to provide the CYMK data directly to the DACs. Thus it is possible to display both RGB information and CYMK information simultaneously on the screen. In one example, this allows display of a CYMK window on a screen of RGB data.

BRIEF DESCRIPTION OF THE DRAWINGS

FIG. 3 comprising

Identical reference numbers in various figures denote similar or identical structures.

DETAILED DESCRIPTION OF THE INVENTION

Figure 1:
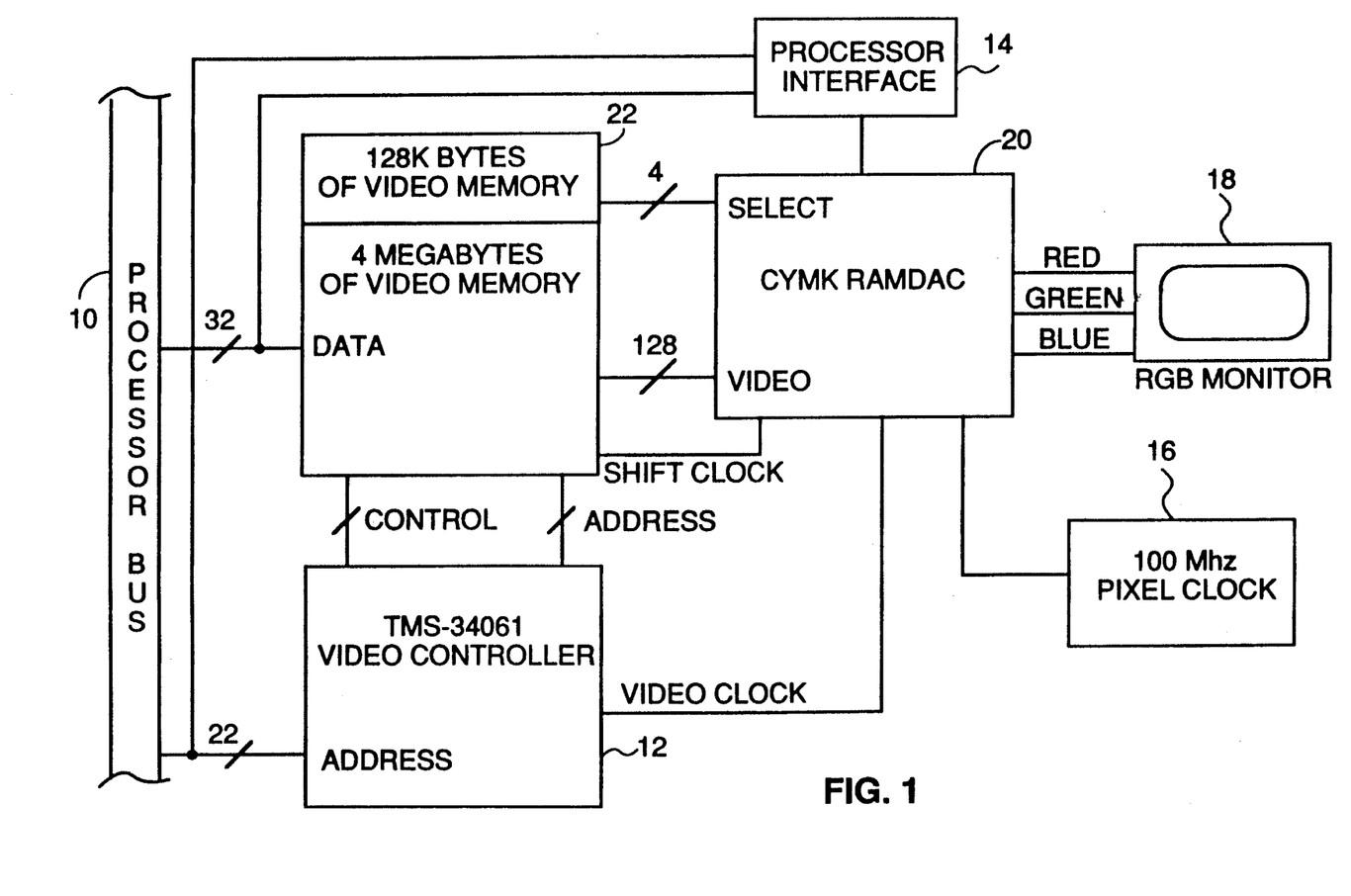
FIG. 1 shows a block diagram of a system in accordance with the invention.

An overview of one embodiment of the invention is shown in FIG. 1. Included are conventional computer processor bus 10, a video controller 12 which is of the TMS-34061 type in one embodiment, conventional micro-processor interface 14 (of the type such as the one used in commercially available Brooktree BT458), conventional 100 MHz pixel clock 16, conventional RGB video monitor 18, CYMK RAMDAC 20, and conventional video RAM 22, including in one embodiment 4.194 megabytes of video RAM connected as shown. RAMDAC 20 and video RAM 22 together are a frame buffer (i.e., display controller). Computer processor bus 10 is typically a part of a conventional computer workstation of the type supplied by Sun Microsystems, Apple Computer, Hewlett-Packard, and others.

The following describes RAMDAC 20 which in one embodiment is a conventionally fabricated custom integrated circuit.

The features of RAMDAC 20 are as follows: (a) 100 mHz video data rates; (2) Real-Time conversion from CYMK color space to RGB color space on a pixel by pixel basis; (3) Support 24/32 bits per pixel; (4) Hardware Pan and Zoom support; (5) 128 bit multiplexed pixel port for easy bit multiplexed selection port for color space selection; (7) Video Sync and VRAM shift clock generation; (8) 256×9 bit LUT's for Gamma Correction; and (9) 9 bit Digital to Analog converters.

Figure 2:
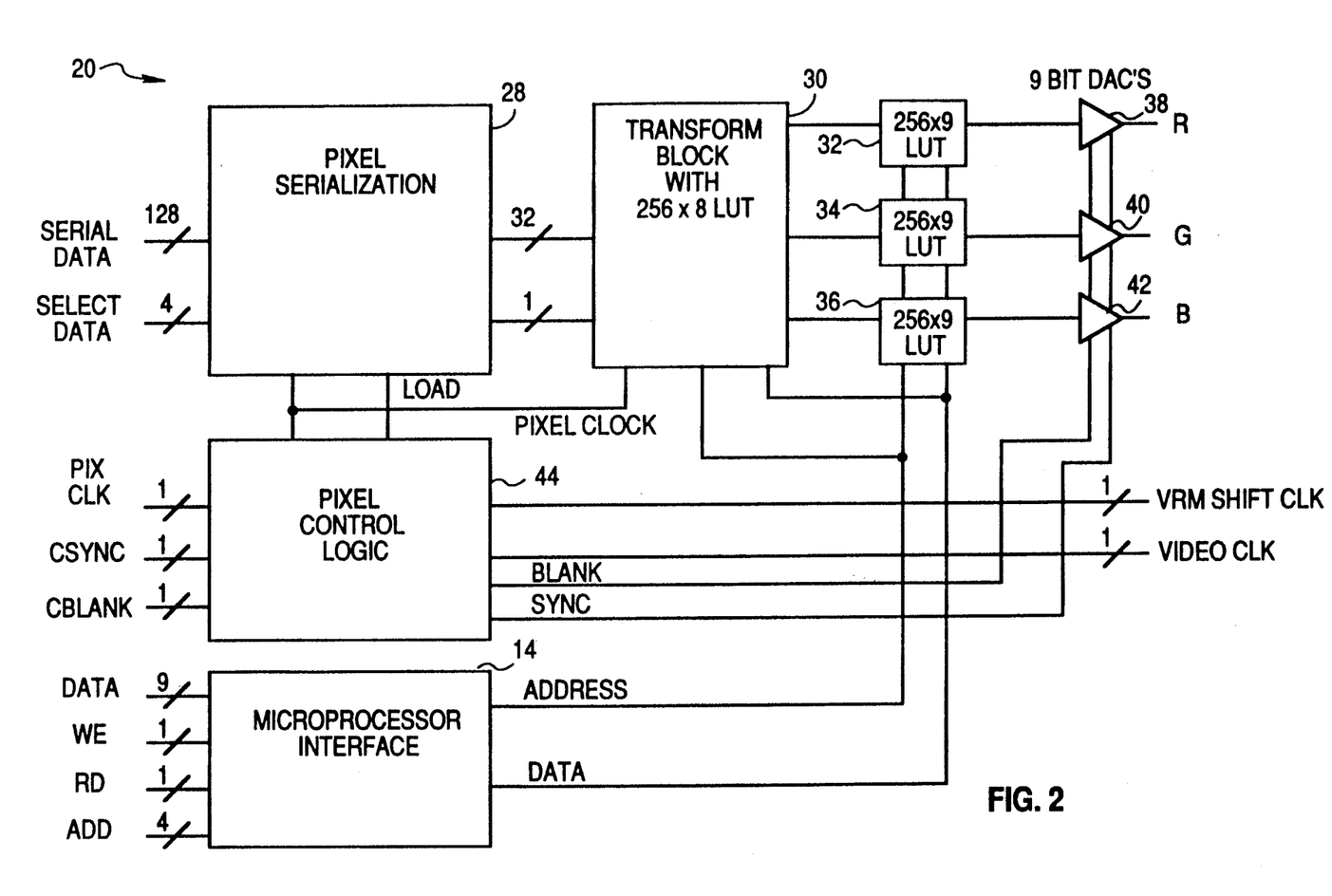
FIG. 2 shows a block diagram of a RAMDAC in accordance with the invention.
Figure 3A:
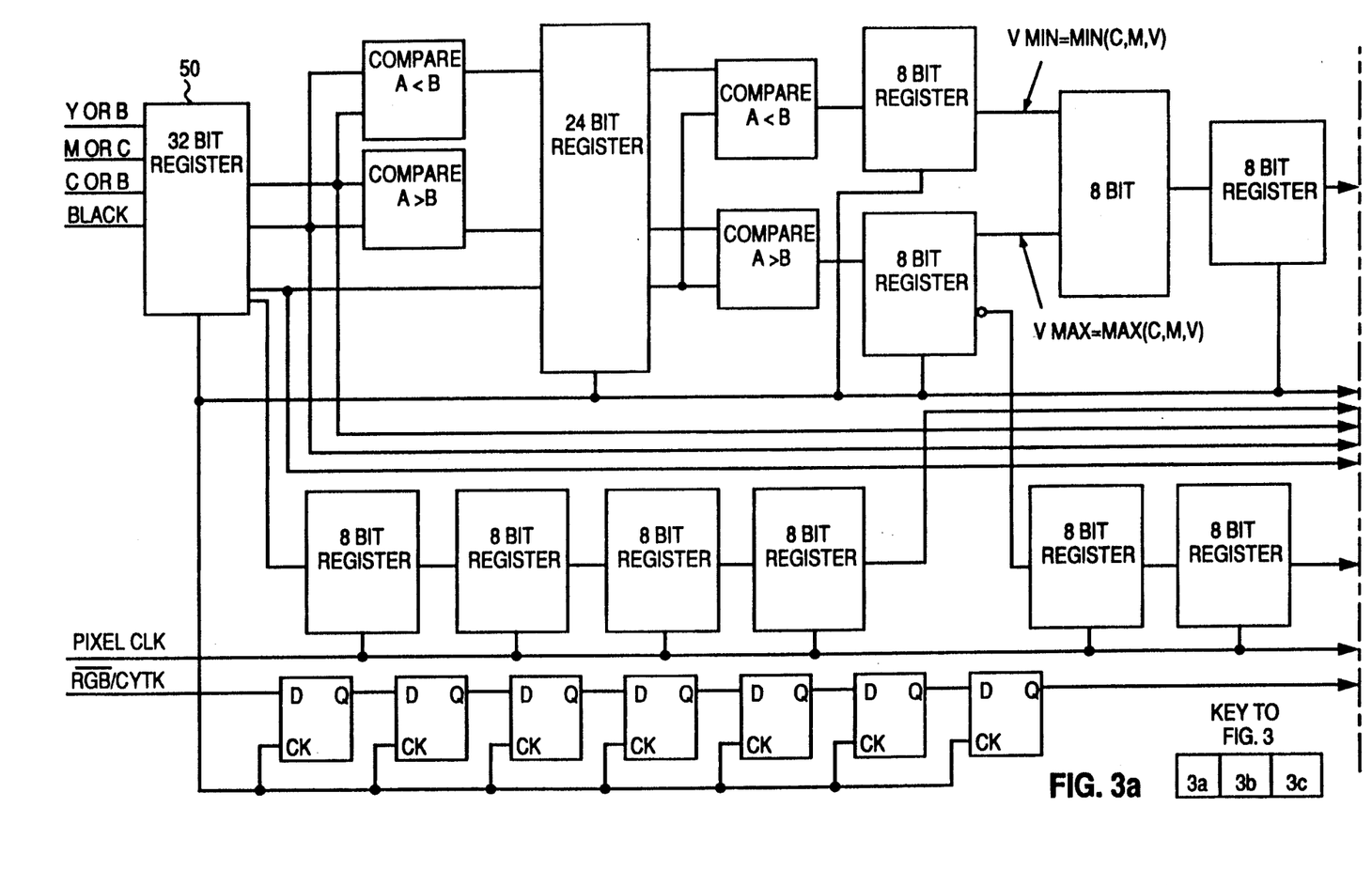
FIGS. 3a–3c shows the transform block of the RAMDAC.
Figure 3B:
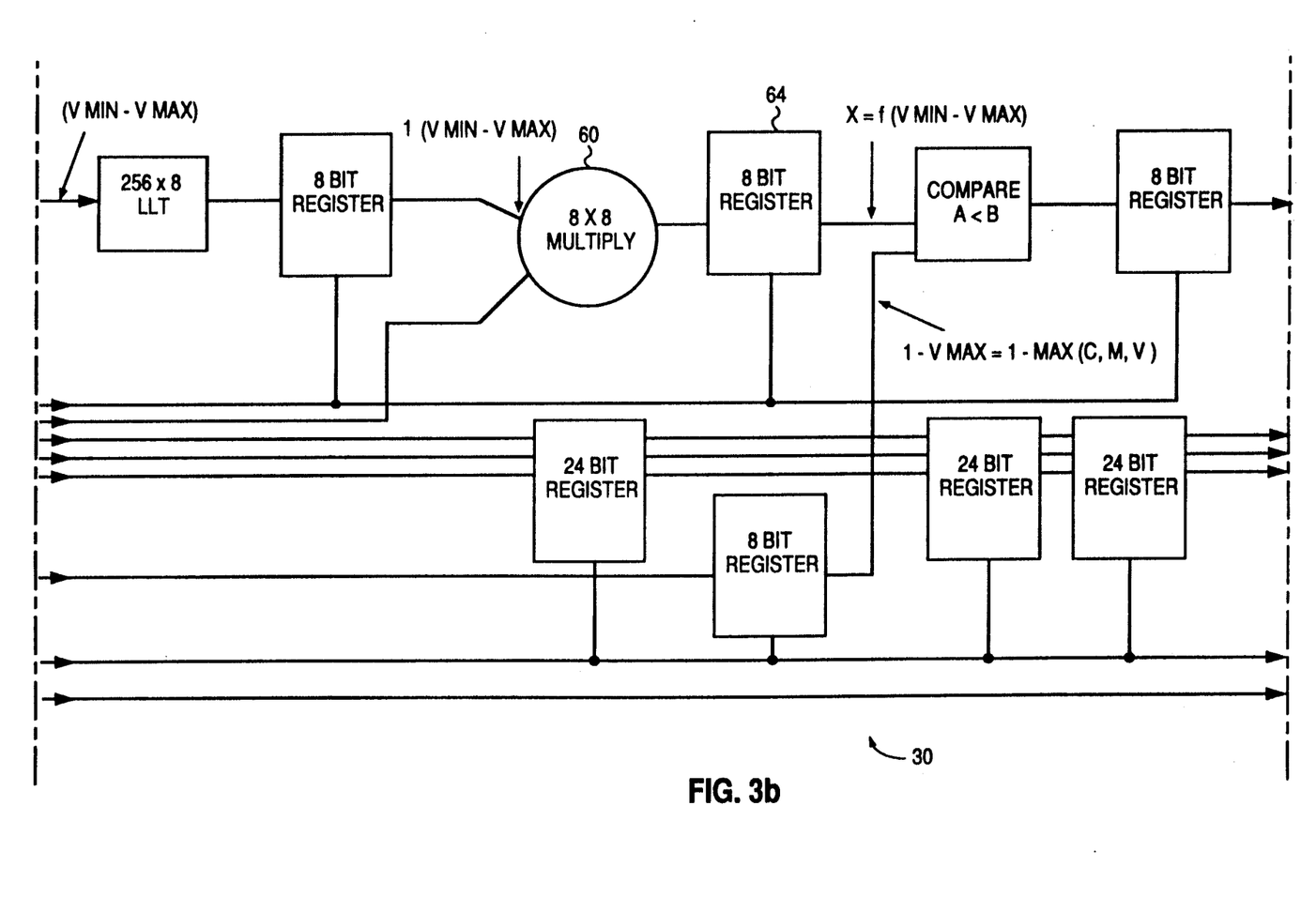
Figure 3C:
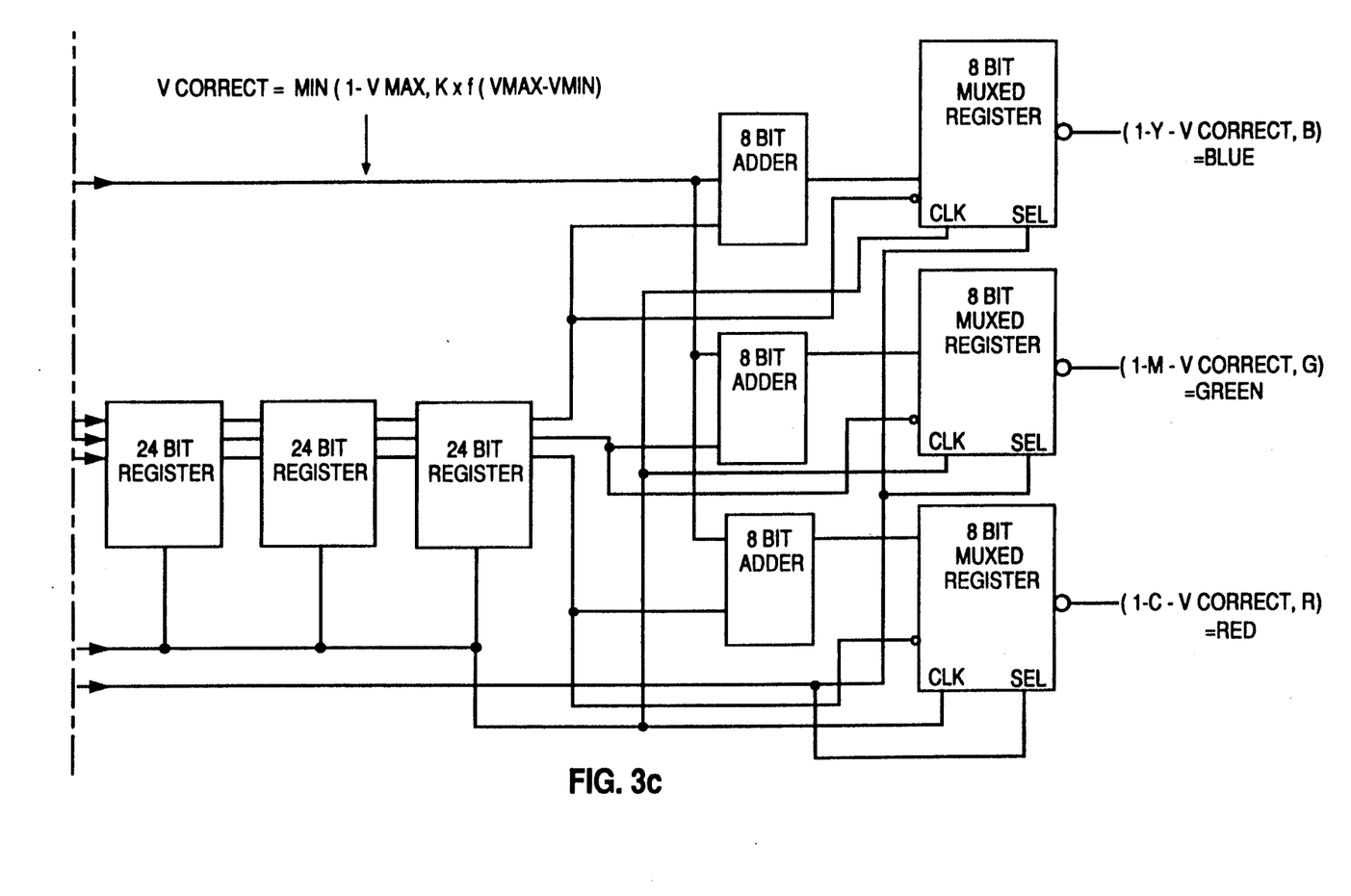

A block diagram of RAMDAC 20 is shown in FIG. 2 including:

Pixel Serialization Logic 28, Transform Logic 30, three 256×9 LUT's 32,34,36, three 9-bit DAC's 38,40,42, Pixel Control Logic 44, and Microprocessor Interface 14.

Pixel Serialization Logic 28 serializes the incoming 128 bits on the first port "SERIAL DATA" into 32 bits of video data. In another embodiment block 28 performs conventional pixel replication zooming of 1×, 2×, 4×, and 8× as well as panning, to four pixel granularity.

A second port ("SELECT DATA") for receiving signals consisting of 4 bits is used to select whether the CYMK conversion is to be performed on a pixel-by-pixel basis or not. This "SELECT DATA" port is multiplexed four ways as are the 128 data bits on the SERIAL DATA port.

Transform Logic 30 performs accurate, user programmable CYMK to RGB transformations at video rates. Block 30 includes a 256×8 LUT, various multiplexers, registers, adders, comparators, and an 8×8 multiply described in more detail below.

Three 256×9 LUT's 32,34,36 (one each for color R,G,B) are each implemented in one embodiment with conventional high speed, dual-ported RAM cells. The maximum data rates in one embodiment are 100 mHz. This RAM array 32,34,36 is loadable during screen visible with a minimum amount of undesirable "sparkling" pixels due to memory contention. LUT's 32,34,36 conventionally provide a correction for gamma, i.e., inconsistencies in the individual monitor in terms of brightness, as determined by feedback from a conventional optical screen probe (not shown).

Three 9 bit DACs 38,40,42 for conversion from digital to analog data formats are provided. Conventional RS-343 output voltage levels are provided by DACs 38,40,42.

Pixel Control Logic 44 (described in more detail below) controls pan, zoom, and controls the VRAM shift clock ("VRAM SHIFT CLK"). A Video Clock ("VIDEO CLK") output is provided which is a fixed divisor of the pixel clock ("PIX CLK"). The CSYNC and CBLANK inputs are synchronous to the Video Clock.

Microprocessor Interface 14 loads from microprocessor bus 10 the various mode registers such as pan, zoom, etc. (not shown) provided in one embodiment of Pixel Control Logic 44 and loads the four LUT's included in blocks 30, 32, 34, and 36 with data. All registers and RAM locations can be read-back conventionally through the Microprocessor Interface 14.

The mathematics for CYMK to RGB transformation used in one embodiment of transform block 30 are based on the well known Neuge bauer color modeling equations. A degenerate case of these equations disclosed by B. Lindbloom in "Accurate Color Reproduction for Computer Graphics Applications," ACM Computer Graphics, Vol. 23, No. 3, July 1989, is as follows:

$R = 1 - C - Vcorrect$
$G = 1 - M - Vcorrect$
$B = 1 - Y - Vcorrect$
$Vcorrect = \min (Vcorrect', 1 - Vcorrect)$
$Vcorrect' = K^* f (Vmax - Vmin)$
$Vmax = \max (C, M, Y)$
$Vmin = \min (C, M, Y)$ RAMDAC 20 operates at data rates in excess of 100 mHz posing a problem in solving the above equations. Current integrated circuit technology allows for additions, comparisons and memory access at 100 mHz data rates, but exponential evaluations are not possible at this rate. A solution to this problem in accordance with the invention is a pipelined arithmetic circuit in Transform Logic 30 as shown in detail by the block diagram of FIG. 3 including conventional logic elements. The flow of data through the various logic elements is as shown. The inputs to the circuitry are at register 50, include four colors CYMK and two control lines, "PIXEL CLK" and a control signal $\overline{RGB/CYMK}$) which bypasses the arithmetic elements and presents the raw RGB data to the DAC's on a pixel-by-pixel basis for windowing as explained below. The 8×8 multiply in block 60 is implemented with a series of high speed additions. The function in block 64 is accomplished by a high speed look-up table. By decomposing the equations into small steps as shown, the results can be accumulated and be fed to the DAC's 38, 40, 42 of FIG. 2 at video data rates in excess of 100 mHz. As shown, the variables of the degenerate Neuge bauer color equations are calculated at various points in FIG. 3.

Figure 4:
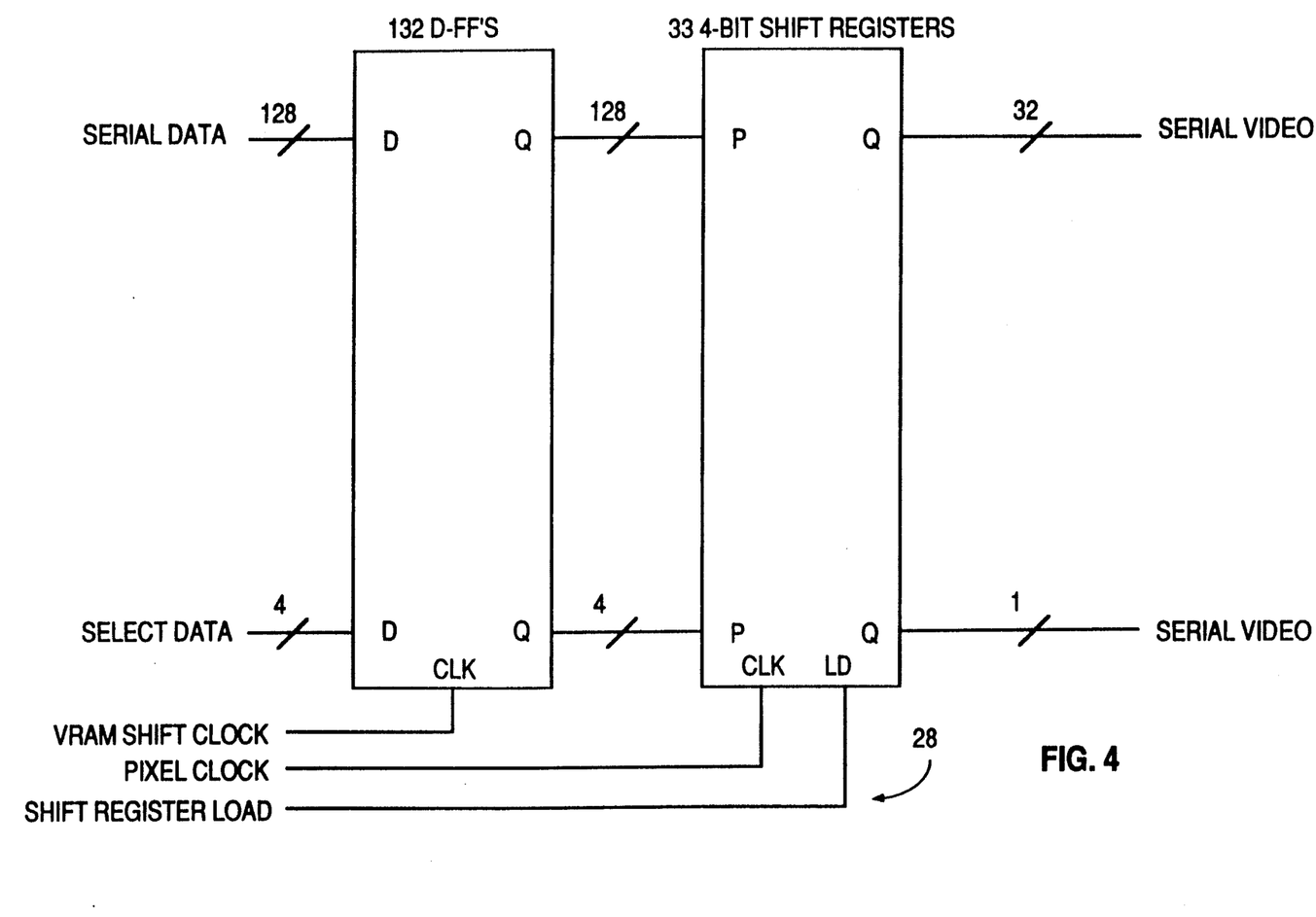
FIG. 4 shows the pixel serialization logic of the RAMDAC.

FIG. 4 shows in more detail in block diagram form the pixel serialization logic 28. Shown are an array of 132 conventional D-type flip-flops, having outputs connected to 33 conventional 4-bit shift registers. The VRAM SHIFT CLOCK line provides a clock input signal to each flip-flop, and the PIXEL CLOCK provides a clock input signal to each shift register.

Pixel serialization circuitry 28 has a 32-wide input data bus for each color CYMK which originates at the VRAM serializer outputs. The VRAM serial data bus is coupled with a pixel frequency clock and the control inputs SYNC and BLANK (see FIG. 2) to control the video. Pixel serialization logic 28 in one embodiment can also zoom in the X direction by 2, 4, and 8 multiplexers under control of microprocessor interface 14.

Figure 5:
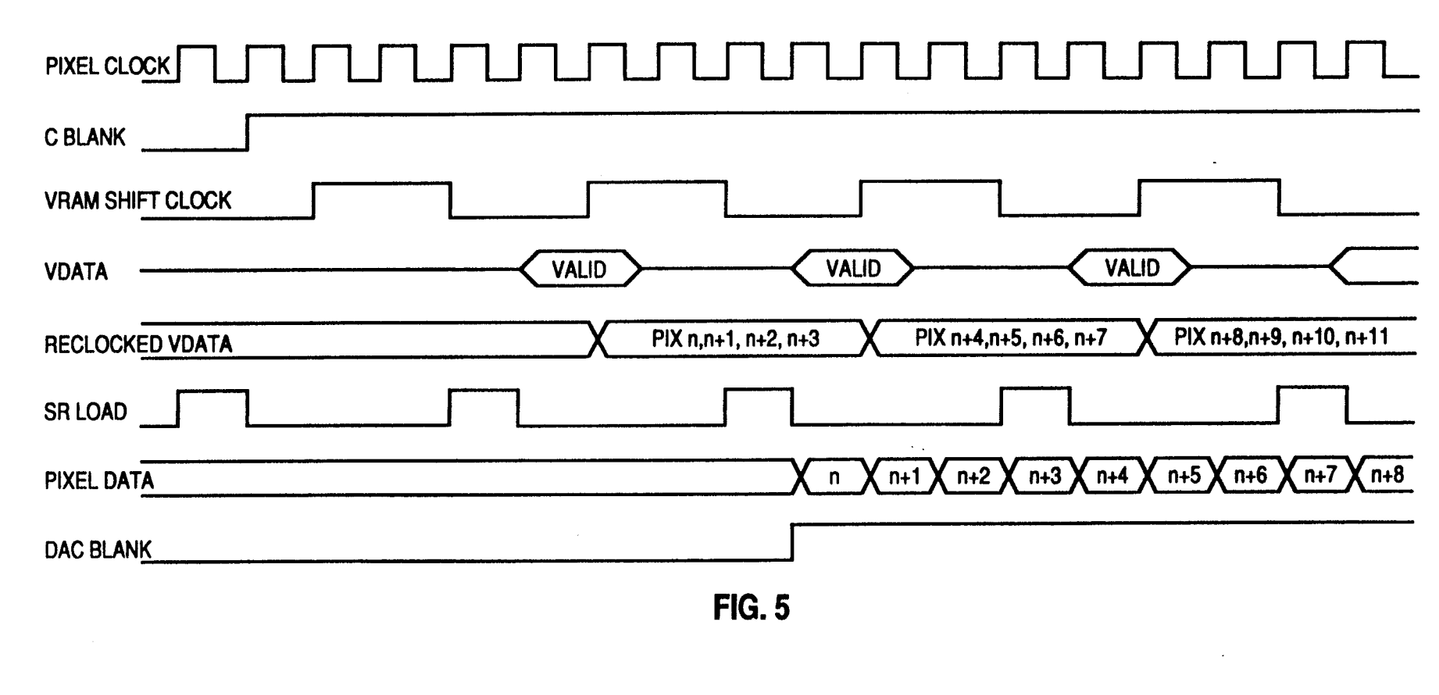
FIG. 5 shows input and output timing for the pixel control logic of FIG. 2.

Pixel control logic 44 of FIG. 2 controls the video backend from the VRAM (Video RAM) serializers to the DACs 38, 40, 42 inputs. VRAM array 22 supports the input scheme of pixel control logic 44. Logic 44 controls the shift clocks to the VRAM, the video clock to the sync generator, and controls the 9-bit DAC 38, 40, 42 interface, including all input timing. FIG. 5 defines pixel control logic 44 in terms of timing. As can be understood, any one of a number of arrangements of logical elements would provide the timing relationships shown in FIG. 5.

The above description is illustrative and not limiting; further modifications will be apparent to one skilled in the art.

What is claimed is:

1. A method of displaying four color data on a three color display monitor comprising the steps of:
   providing a display controller including a color converter and at least three digital to analog converters on one integrated circuit;
   providing the four color data as four color digital pixel data;
   transforming the four color digital pixel data to digital three color pixel data in the color converter;
   converting the digital three color pixel data to analog data in the digital to analog converters;
   displaying the analog data on the monitor;
   providing a control signal for controlling display of individual pixels on the monitor;
   in response to the control signal displaying on a portion of the monitor a plurality of individual pixels each of which has been transformed to the three color pixel data; and
   displaying on a remaining portion of the monitor, color pixel data which has not been transformed.

2. The method of claim 1, wherein the step of transforming comprises the step of looking up values in a look-up table.

3. The method of claim 1, wherein the step of transforming is performed pixel by pixel at a video data rate.

4. The method of claim 1, further comprising the step of performing a brightness correction by a look up table relative to the particular display monitor on the digital three color data prior to the step of converting.

5. The method of claim 1, wherein the four color digital pixel data is 32 bits per pixel.

6. The method of claim 1, wherein the step of transforming includes the steps of:
providing in the color converter connected transforming elements for serially transforming the four color digital pixel data in each transforming element so that as a particular transforming element completes a transformation, the particular transforming element receives additional data, thereby pipelining the step of transforming.

7. The method of claim 1, further comprising the step of storing the four color digital pixel data for further processing at the same time as the step of transforming.

8. The method of claim 1, wherein the portion of the monitor is a window, and the window is displayed on the monitor simultaneously with the color pixel data which has not been transformed.

9. A display controller for a three color display monitor comprising:
means for providing four color serial data;
means for arranging the four color serial data into at least 32 bits per pixel of the display monitor;
look up table logic circuitry for transforming the at least 32 bits per pixel into three color digital data;
digital to analog converters for converting the three color digital data into analog data;
means for providing a control signal for controlling display of individual pixels on the monitor;
means for displaying on a portion of the monitor in response to the control signal a plurality of individual pixels each of which has been transformed to the three color pixel data; and
means for displaying on a remaining portion of the monitor, color display data which has not been transformed.

10. The device of claim 9, further comprising:
three look up tables for correcting a brightness level relative to the particular display monitor of each of the three colors of the digital data, thereby correcting for inconsistencies in the particular display monitor.

11. The device of claim 11, wherein the look up table logic circuitry includes:
a connected series of transforming elements each capable of transforming a data element and passing the transformed data element to a next transforming element in the series thereby pipelining transformation of a data element.

12. The device of claim 11, wherein at least one of the transforming elements is the look-up table.

13. The device of claim 11, wherein each transforming element transforms the data element in less than the time needed by the display monitor to process the data for one pixel.

14. The device of claim 9, further comprising means for storing the four color serial data as four color serial data.

15. The device of claim 9, wherein the portion of the monitor is a window, and the window is displayed on the monitor simultaneously with the color pixel data which has not been transformed.

* * * * *